(12) United States Patent
Hatta (10) Patent No.: US 10,285,055 B2
(45) Date of Patent: May 7, 2019

(54) AUTHENTICATION SYSTEM, AUTHENTICATION METHOD, SERVER DEVICE, AND CLIENT DEVICE

(71) Applicant: MINEBEA MITSUMI INC., Miyota-machi, Kitasaku-gun, Nagano (JP)

(72) Inventor: Kunihiko Hatta, Kanagawa (JP)

(73) Assignee: MINEBEA MITSUMI INC., Nagano (JP)

(*) Notice: Subject to any disclaimer, the term of this patent is extended or adjusted under 35 U.S.C. 154(b) by 251 days.

(21) Appl. No.: 15/133,865

(22) Filed: Apr. 20, 2016

(65) Prior Publication Data

US 2016/0352716 A1 Dec. 1, 2016

(30) Foreign Application Priority Data

May 27, 2015 (JP) .................................. 2015-107591

(51) Int. Cl.
*H04W 12/06* (2009.01)
*H04L 29/06* (2006.01)

(52) U.S. Cl.
CPC ......... *H04W 12/06* (2013.01); *H04L 63/0492* (2013.01)

(58) Field of Classification Search
CPC ........................... H04W 12/06; H04L 63/0492
See application file for complete search history.

(56) References Cited

U.S. PATENT DOCUMENTS

| | | | | |
|---|---|---|---|---|
| 6,976,168 B1 * | 12/2005 | Branstad | ............... | H04L 9/0643 380/280 |
| 7,889,999 B2 * | 2/2011 | Ann | ..................... | H04B 10/116 398/172 |
| 8,787,760 B2 * | 7/2014 | Yamada | ............. | H04B 10/1149 398/67 |
| 2016/0337403 A1 * | 11/2016 | Stoops | ................ | H04L 63/0861 |

FOREIGN PATENT DOCUMENTS

WO 2011/080867 A1 7/2011

OTHER PUBLICATIONS

Jim Hayes "Guide to Fiber Optics & Premises Cabling" 2002-2010, retrieved from http://www.thefoa.org/tech/wavelength.htm.*

* cited by examiner

*Primary Examiner* — Robert B Leung
*Assistant Examiner* — Thomas Ho
(74) *Attorney, Agent, or Firm* — Pearne & Gordon LLP (57) ABSTRACT

A server device of an authentication system includes: an optical signal communication unit that causes optical signal transmitters to repeatedly transmit modulated optical signals, by notifying, of pieces of partial authentication information stored in an authentication information management unit, the optical signal transmitters respectively related to the pieces of partial authentication information; and an authentication processing unit that authenticates, when authentication is requested from a client device, the client device, based on integrated authentication information notified with the request, and integrated authentication information before being segmented into the respective pieces of partial authentication information notified by the optical signal communication unit.

10 Claims, 7 Drawing Sheets

AUTHENTICATION SYSTEM, AUTHENTICATION METHOD, SERVER DEVICE, AND CLIENT DEVICE

CROSS-REFERENCE TO RELATED APPLICATION

The present application claims priority to and incorporates by reference the entire contents of Japanese Patent Application No. 2015-107591 filed in Japan on May 27, 2015.

BACKGROUND OF THE INVENTION

1. Field of the Invention

The present invention relates to the technology of authentication systems, authentication methods, server devices, and client devices.

2. Description of the Related Art

Various systems have been proposed, in which server devices for providing services authenticate client devices for receiving the provided services. For example, merely causing a client device to simply input authentication information, such as an ID and a password, imposes burdensome set-up work on a user.

Thus, in International Publication Pamphlet No. WO 2011/080867, as a method of automatically setting authentication information, a method is described, in which an optical signal resulting from modulation of authentication information is transmitted from a light emitting diode to a client device. Thereby, the security is able to be improved, by controlling not to provide any service unless a distance between a server device and the client device is equal to or less than a certain distance.

In a system, where authentication information is automatically set, if a malicious user is able to receive the authentication information, a server device will be automatically abused, and thus, a means to improve the security more while keeping the convenience of the automatic authentication is desired.

For example, according to the method in International Publication Pamphlet No. WO 2011/080867, if a malicious user is able to receive at a certain moment, even at one location, the optical signal resulting from modulation of the authentication information, there is a risk that the authentication information may be abused.

SUMMARY OF THE INVENTION

It is an object of the present invention to at least partially solve the problems in the conventional technology.

An authentication system includes: a client device that requests authentication, a server device that authenticates the client device, and optical signal transmitters that transmit, as optical signals, authentication information to be used in the authentication, wherein the server device comprises, an authentication information management unit that associates each piece of partial authentication information resulting from segmentalization of one piece of integrated authentication information into plural pieces, with the optical signal transmitter in charge of transmission of that piece of partial authentication information, an optical signal communication unit that causes the respective optical signal transmitters to repeatedly transmit demodulated optical signals, by notifying, of the pieces of partial authentication information stored in the authentication information management unit, the optical signal transmitters related respectively to the pieces of partial authentication information, and an authentication processing unit that authenticates, when authentication is requested from the client device, the client device, based on the piece of integrated authentication information notified with the request, and the piece of integrated authentication information before being segmentalized into the respective pieces of partial authentication information notified by the optical signal communication unit, and the client device comprises an authentication information obtaining unit that receives the respective optical signals transmitted from the respective optical signal transmitters, and obtains the respective pieces of partial authentication information by demodulating the received optical signals, and an authentication information integrating unit that integrates the plural pieces of partial authentication information obtained by the authentication information obtaining unit into the one piece of integrated authentication information, and requests the server device for authentication, by use of the integrated piece of integrated authentication information.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment will be described in detail, with reference to the drawings.

Figure 1A:
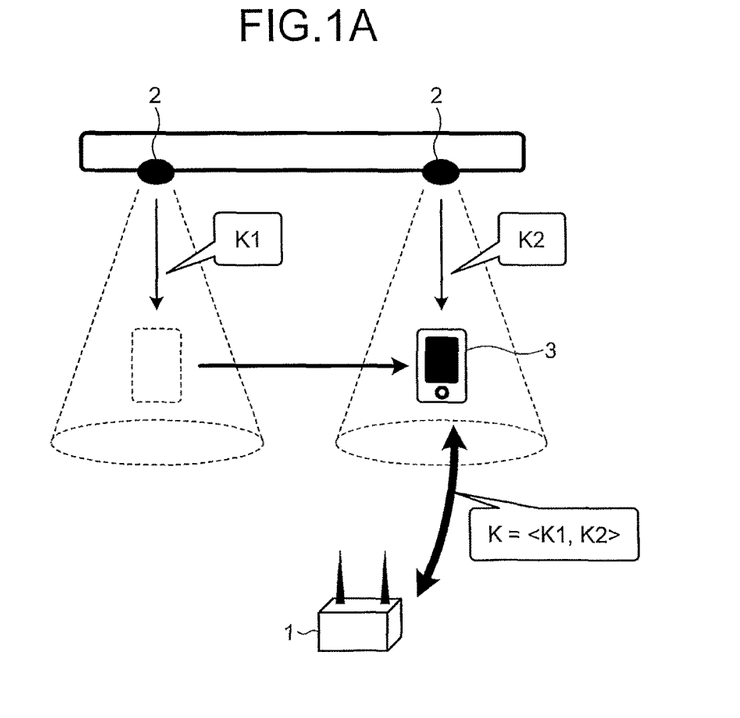
FIG. 1A is a schematic diagram of an authentication system.

FIG. 1A is a schematic diagram of an authentication system.

The authentication system is configured to include a server device 1, a plurality of optical signal transmitters 2, and a client device 3. Each of the devices of the authentication system illustrated in FIG. 1A is configured as a computer having a central processing unit (CPU), a memory, a hard disk (storage means), and a network interface, and this computer causes each processing unit to operate by the CPU executing a program loaded on the memory.

The server device 1 segmentalizes (divides) a piece of authentication information (security ID) for authenticating the client device 3 into plural pieces, and distributes the respective segmentalized pieces of authentication information to the client device 3 via the separate optical signal transmitters 2. The security ID is, for example, a 128-bit key according to the Wi-Fi Protected Access 2 (WPA2) standard of Wi-Fi (registered trademark), or a 4-digit pass key according to Bluetooth (registered trademark).

Hereinafter, the one piece of authentication information before being segmentalized will be referred to as "piece of integrated authentication information", and the plural pieces of authentication information after being segmentalized will be referred to as "pieces of partial authentication information". In FIG. 1A, an example is illustrated, in which one piece of integrated authentication information (K) is segmentalized into two pieces of partial authentication information (K1 and K2), but the number into which the one piece of integrated authentication information (K) is segmentalized may be any number, not being limited to two.

Obtaining the pieces of partial authentication information by dividing the one piece of integrated authentication information as described above is a simple method, but the present invention is not limited to this method, and a result obtained when predetermined arithmetic operation is carried out by use of pieces of partial authentication information may be one piece of integrated authentication information.

That is, K=f(K1, K2), and "f" may be expressed as a predetermined function.

Further, in an arithmetic expression, a part of the pieces of partial authentication information may be parameters of a predetermined function, and the other part of the pieces of partial authentication information may be variables of the predetermined function. Furthermore, a part of the pieces of partial authentication information may be a part, from which any piece to be used this time is selected from prepared plural functions and parameters. Including these, in this specification, the above will be referred to as the one piece of integrated authentication information and the pieces of partial authentication information.

Therefore, the one piece of integrated authentication information is data (a common key, or the like) used in authentication, and the plural pieces of partial authentication information are material data for generating the data used in the authentication.

The respective optical signal transmitters 2 continue to transmit (emit) optical signals resulting from modulation of the respective pieces of partial authentication information notified from the server device 1, towards peripheries of the optical signal transmitters 2 themselves (irradiation ranges). The client device 3 positioned in this irradiation range is able to obtain the piece of partial authentication information, by receiving the optical signal.

A communication standard, which may be used for the server device 1 to notify the optical signal transmitters 2 of the pieces of partial authentication information, is, for example: the communication standard for lighting control, Digital Addressable Lighting Interface (DALI); Digital Multiplex with 512 pieces of Information (DMX512-A); LonWorks; the communication standard utilizing electric power lines in data communication, Power Line Communication (PLC); or the like.

Moreover, a communication means, which may be used for transmitting the pieces of partial authentication information from the optical signal transmitters 2 to the client device 3, is: infrared (IR) communication; or visible light communication. For example, the standard, "CP-1223", may be used, which has been proposed by Visible Light Communications Consortium (VLCC), a standardization body of visual light communication technology, to Japan Electronics and Information Technology Industries Association (JEITA), a general incorporated association.

The client device 3 is, for example, a smartphone held by a user. By moving into the irradiation ranges of the respective optical signal transmitters 2, the client device 3 receives the pieces of partial authentication information from the respective optical signal transmitters 2. The client device 3 integrates the respective pieces of partial authentication information (K1 and K2) into the one piece of integrated authentication information (K), and requests, based on that piece of integrated authentication information, the server device 1 for authentication processing, and for service providing processing upon success of the authentication.

As described above, as compared to a mode where authentication information is directly distributed from the server device 1 to the client device 3, in this mode where authentication information is distributed via the optical communication of the optical signal transmitters 2, the client device 3 that is able to be authenticated is able to be limited within the irradiation ranges of the optical signal transmitters 2, and thus advanced security in association with the physical position is able to be realized.

In addition, by carrying out distribution by segmentalization of the one piece of authentication information to be distributed via optical communication into the plural pieces of partial authentication information, compatibility with finer authentication needs is able to be achieved (details thereof in FIG. 7 and the like).

Figure 1B:
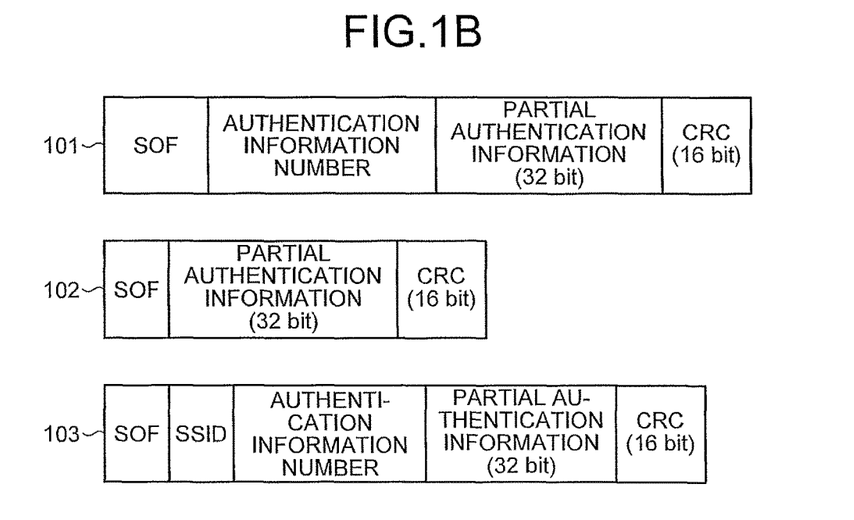
FIG. 1B illustrates data contents of optical communication exchanged in the authentication system of FIG. 1A.

FIG. 1B illustrates data contents of optical communication exchanged in the authentication system of FIG. 1A. Each of packets 101, 102, and 103 is an example of data emitted as an optical signal from the optical signal transmitters 2. These packet formats follow, for example, the standard "VLCC-STD-003", enacted by the standardization body, VLCC.

The packet 101 is configured to include, in order from a head thereof, a start of frame (SOF), an authentication information number, a piece of partial authentication information having a length of 32 bits, and a cyclic redundancy check (CRC) having a length of 16 bits. The authentication information number indicates a positional relation between its own piece of partial authentication information and the one piece of integrated authentication information, into which the piece of partial authentication information is to be integrated, and for example, if a 128-bit key is divided into four, and a second one of the divided four pieces of partial authentication information (32 bits) is to be stored, the authentication information number is "2/4".

The packet 102 is the same as the packet 101 except that the authentication information number has been omitted therefrom. This packet 102 is used when the authentication information number is able to be obtained by another means (for example, by reception order).

The packet 103 is the same as the packet 101, except that a service set identifier (SSID) of Wi-Fi (registered trademark) has been added thereto. Based on the SSID notified with this packet 103, the client device 3 establishes Wi-Fi (registered trademark) connection with the server device 1. Instead of making the SSID explicit like in the packet 103, a combination of the SSID and a key may be the piece of integrated authentication information (the SSID may be made stealth).

Figure 2:
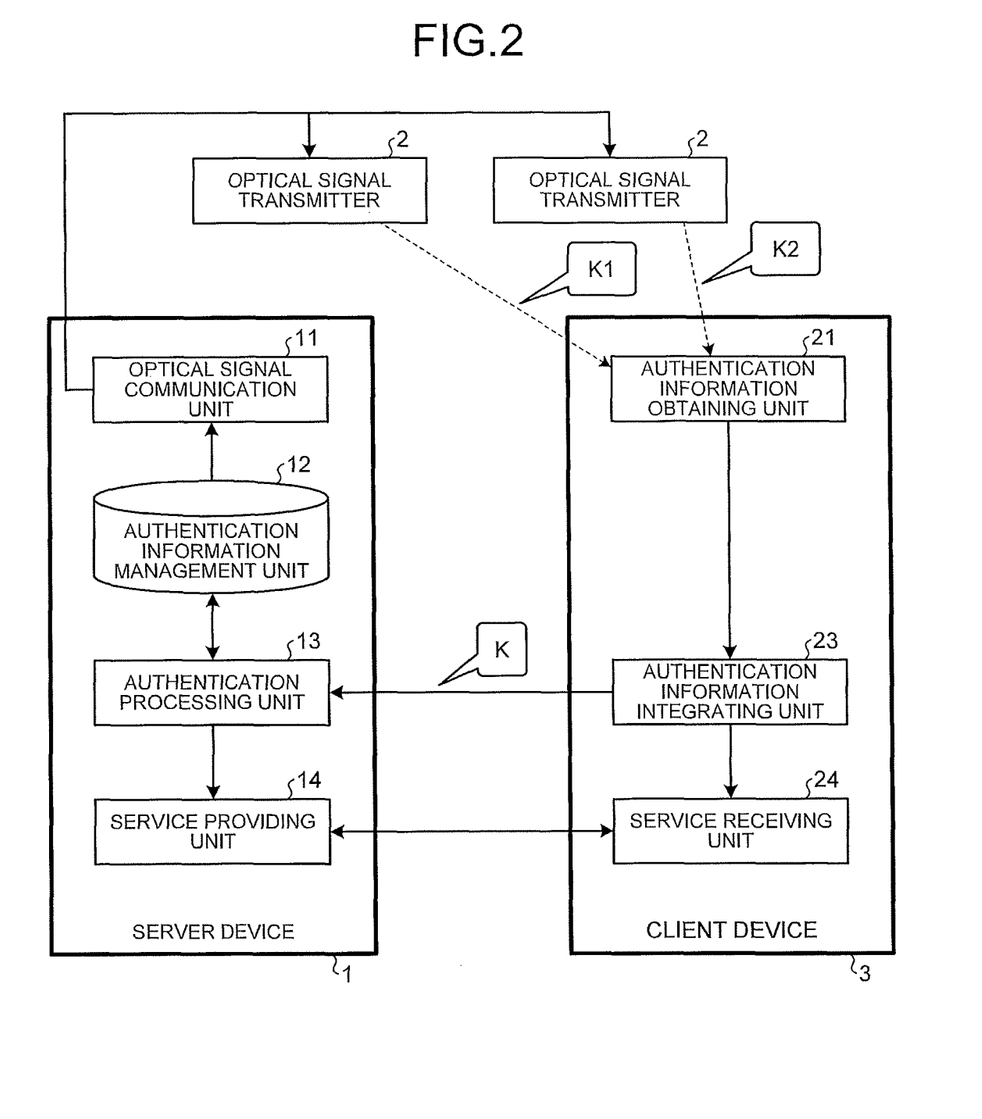
FIG. 2 is a diagram of a configuration of an authentication system related to an embodiment.

FIG. 2 is a diagram of a configuration of the authentication system.

The server device 1 is configured to include an optical signal communication unit 11, an authentication information management unit 12, an authentication processing unit 13, and a service providing unit 14.

The client device 3 is configured to include an authentication information obtaining unit 21, an authentication information integrating unit 23, and a service receiving unit 24.

The optical signal communication unit 11 notifies, of the pieces of partial authentication information (K1 and K2) stored in the authentication information management unit 12, the optical signal transmitters 2 respectively related to the pieces of partial authentication information (K1 and K2). The authentication information management unit 12 carries out management, by respectively storing the pieces of partial authentication information in association with the optical signal transmitters 2. This association may be made, such that one piece of partial authentication information is transmitted from one of the optical signal transmitters 2, or plural pieces of partial authentication information are transmitted from one of the optical signal transmitters 2 with a time difference among them.

The authentication information obtaining unit 21 receives, through a light receiving sensor, the respective optical signals transmitted from the respective optical signal transmitters 2, demodulates the received optical signals, and obtains the respective pieces of partial authentication information.

The authentication information integrating unit 23 integrates the respective pieces of partial authentication information (K1 and K2) obtained by the authentication information obtaining unit 21 into the piece of integrated authentication information (K), and by using that piece of integrated authentication information, requests the authentication processing unit 13 of the server device 1 for authentication.

The authentication processing unit 13 authenticates, based on the piece of integrated authentication information (K) requested from the client device 3, and the piece of integrated authentication information (K)=(K1, K2) stored in the authentication information management unit 12, whether or not a service is allowed to be provided to the client device 3.

The service providing unit 14 provides various services as exemplified below, to the service receiving unit 24 of the client device 3 that has succeeded in the authentication.

Establishing wired or wireless communication connection between the client device 3 and the server device 1, and providing a communication service (the Internet connection, or the like) via that communication connection, with the server device 1 being a relay device therefor. As described already, by use of distributed authentication information (a Wi-Fi key, or a Bluetooth pass key), connection (Wi-Fi connection or Bluetooth connection) higher in speed than the communication of the optical signals from the optical signal transmitters 2 (4.8 kbps) is able to be provided. If the speed of the communication of the optical signals from the optical signal transmitters 2 (4.8 kbps) is directly increased, when light emitted as lighting is used as a transmission signal, a side effect of the lighting flickering and imposing inconvenience on a user will be caused.

A contents distribution service in association with positions of the client device 3 (positions at which the optical signals are received from the optical signal transmitters 2). The above described communication connection may be used or may not be used in this distribution processing.

User movement assisting processing, such as opening a gate in association with positions of the client device 3 (positions at which the optical signals are received from the optical signal transmitters 2).

Figure 3:
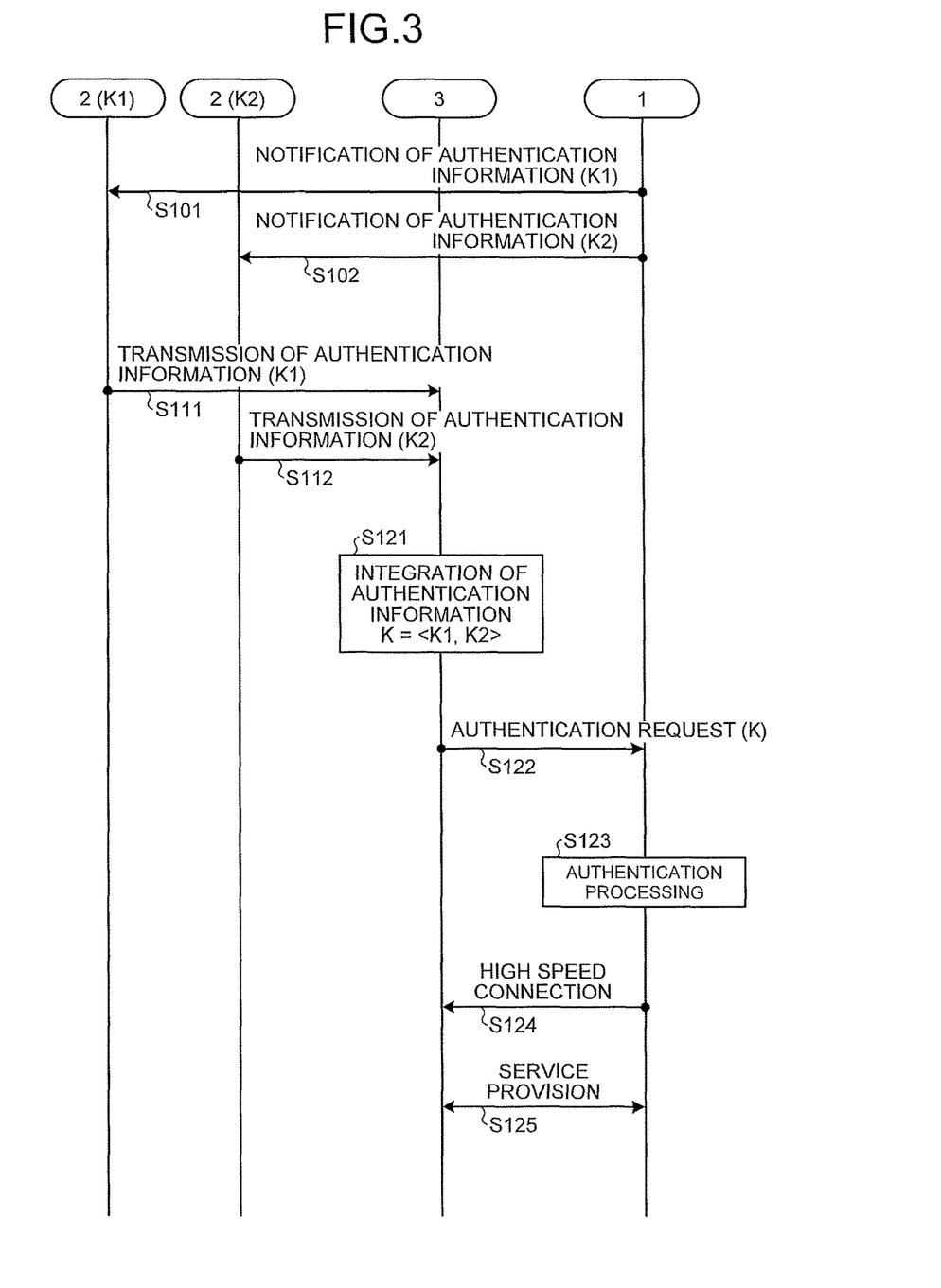
FIG. 3 is a sequence diagram illustrating authentication processing of the authentication system related to the embodiment.

FIG. 3 is a sequence diagram illustrating the authentication processing of the authentication system.

At Step S101, the server device 1 notifies the optical signal transmitter 2 (hereinafter, referred to as the optical signal transmitter 2 (K1)) in charge of transmission of the piece of partial authentication information (K1) preregistered in the authentication information management unit 12, of the piece of partial authentication information (K1).

Similarly at Step S102 too, the server device 1 notifies the optical signal transmitter (K2) of the piece of partial authentication information (K2).

At Step S111, the optical signal transmitter 2 (K1) transmits the notified piece of partial authentication information (K1), as an optical signal, to the client device 3 in a periphery of the optical signal transmitter 2 (K1).

Similarly at S112 too, the optical signal transmitter 2 (K2) transmits the notified piece of partial authentication information (K2), as an optical signal, to the client device 3 in a periphery of the optical signal transmitter 2 (K2).

At Step S121, the client device 3 integrates the respective pieces of partial authentication information (K1 and K2) transmitted in Steps S111 and S112 into the one piece of integrated authentication information (K). This integration processing is, for example, processing of connecting the pieces of partial authentication information together from the head, in order of the authentication information numbers in the packets 101.

At Step S122, the client device 3 transmits an authentication request, including the piece of integrated authentication information (K) integrated in Step S121, to the server device 1.

At Step S123, the server device 1 authenticates the piece of integrated authentication information (K) of the client device 3 requested in Step S122.

At Step S124, the server device 1 provides high speed connection of Wi-Fi or the like, to the client device 3, which has succeeded in the authentication in Step S123.

At Step S125, the server device 1 provides a service using the high speed connection of Step S124, or a service not using that high speed connection, to the client device 3.

Figure 4:
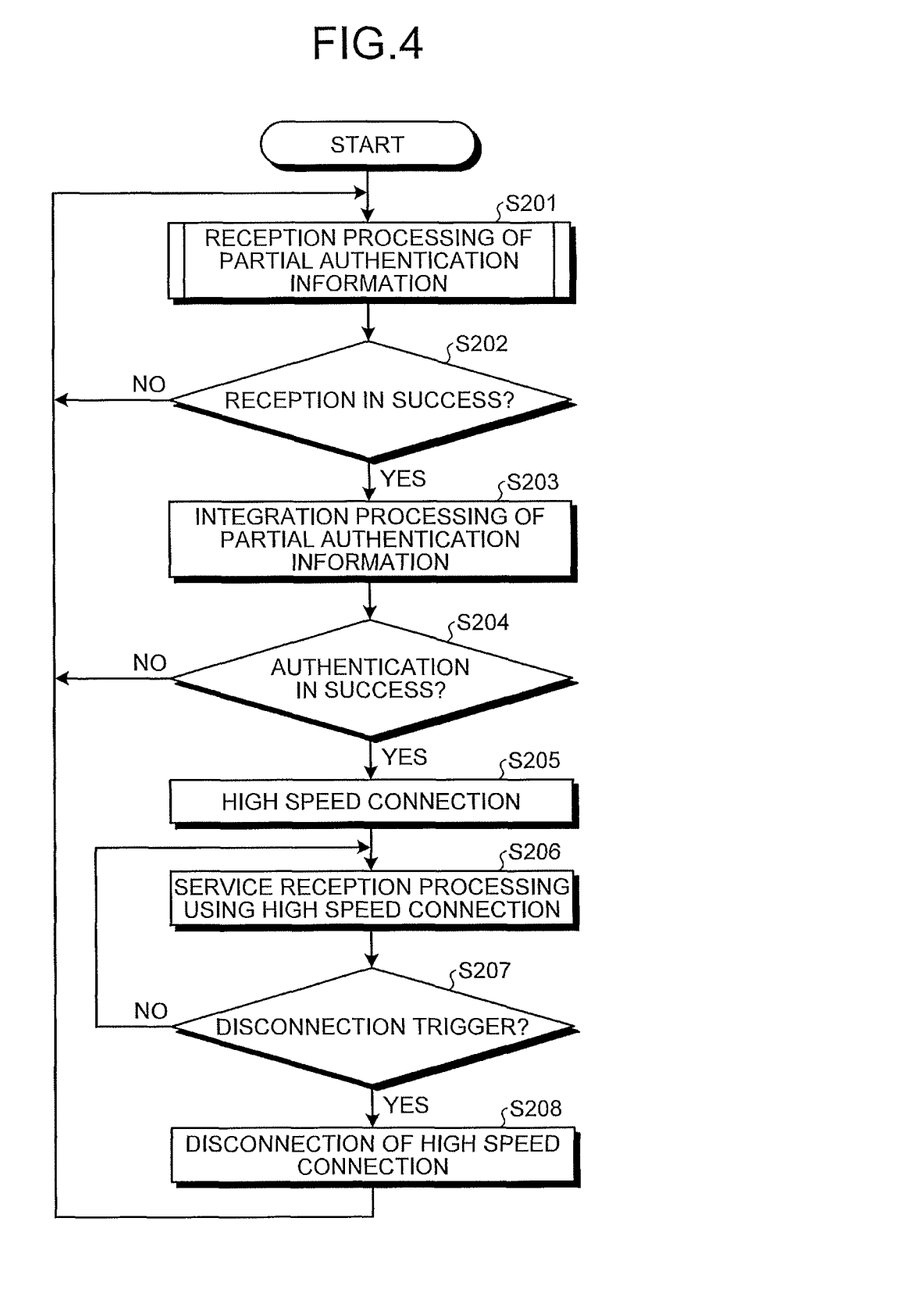
FIG. 4 is a flow chart focusing on a client device with respect to the authentication processing in FIG. 3 related to the embodiment.

FIG. 4 is a flow chart focusing on the client device 3 with respect to the authentication processing in FIG. 3. Hereinafter, as appropriate, with reference to the respective steps (S101 to S125) in FIG. 3, FIG. 4 will be described.

At Step S201, the authentication information obtaining unit 21 carries out reception processing of the respective pieces of partial authentication information (Steps S111 and S112).

At Step S202, the authentication information obtaining unit 21 determines whether or not the reception of the respective pieces of partial authentication information has succeeded. For example, if one piece of integrated authentication information (K) has been segmentalized into four pieces of partial authentication information (K1 to K4), when all of the pieces of partial authentication information K1 to K4 have been received by the same client device 3, the reception in Step S202 is regarded as having succeeded. If a result of the determination at S202 is "Yes", the processing is advanced to Step S203, and if "No", the processing is returned to Step S201.

At Step S203, the authentication information integrating unit 23 integrates the respective pieces of partial authentication information received in Step S201 into one piece of integrated authentication information (Step S121). The authentication information obtaining unit 21 is able to identify which part of the piece of integrated authentication information to be integrated into, the piece of partial authentication information received this time is, by referring to the authentication information number in the packet 101 or the reception order of the packet 102.

At Step S204, the authentication information integrating unit 23 determines whether or not the authentication processing (Step S123) requested in Step S122 has succeeded, based on, for example, a reply from the server device 1. If a result of the determination at S204 is "Yes", the processing is advanced to Step S205, and if "No", the processing is returned to Step S201.

At Step S205, the service receiving unit 24 establishes high speed connection of Step S124, with the server device 1 (server providing unit 14).

At Step S206, the service receiving unit 24 receives a service using the high speed connection of S205 from the server device 1 (service providing unit 14) (Step S125).

At Step S207, the authentication information obtaining unit 21 detects a disconnection trigger, as exemplified below.

When a piece of partial authentication information different from the piece of partial authentication information received lastly in Step S201 is obtained. In this case, the "piece of partial authentication information different" therefrom is used in reconnection after disconnection.

When a predetermined time period has elapsed after start of the processing of Step S205 or S206.

When a signal instructing a disconnection trigger is received from another device, such as the server device 1, or the optical signal transmitter 2.

At Step S208, the authentication information obtaining unit 21 disconnects the high speed connection of Step S205 according to the disconnection trigger (Step S207: Yes). That is, the client device 3 cancels the authentication with the server device 1, which has already succeeded. Thereby, if the client device 3 has moved to a location (outdoor) away from the authentication location, by interrupting the service, security according to the location of the client device 3 is able to be achieved.

Until a disconnection trigger is generated (S207: No), the authentication information obtaining unit 21 waits for the next disconnection trigger while continuing the service using the high speed connection (S206).

Figure 5:
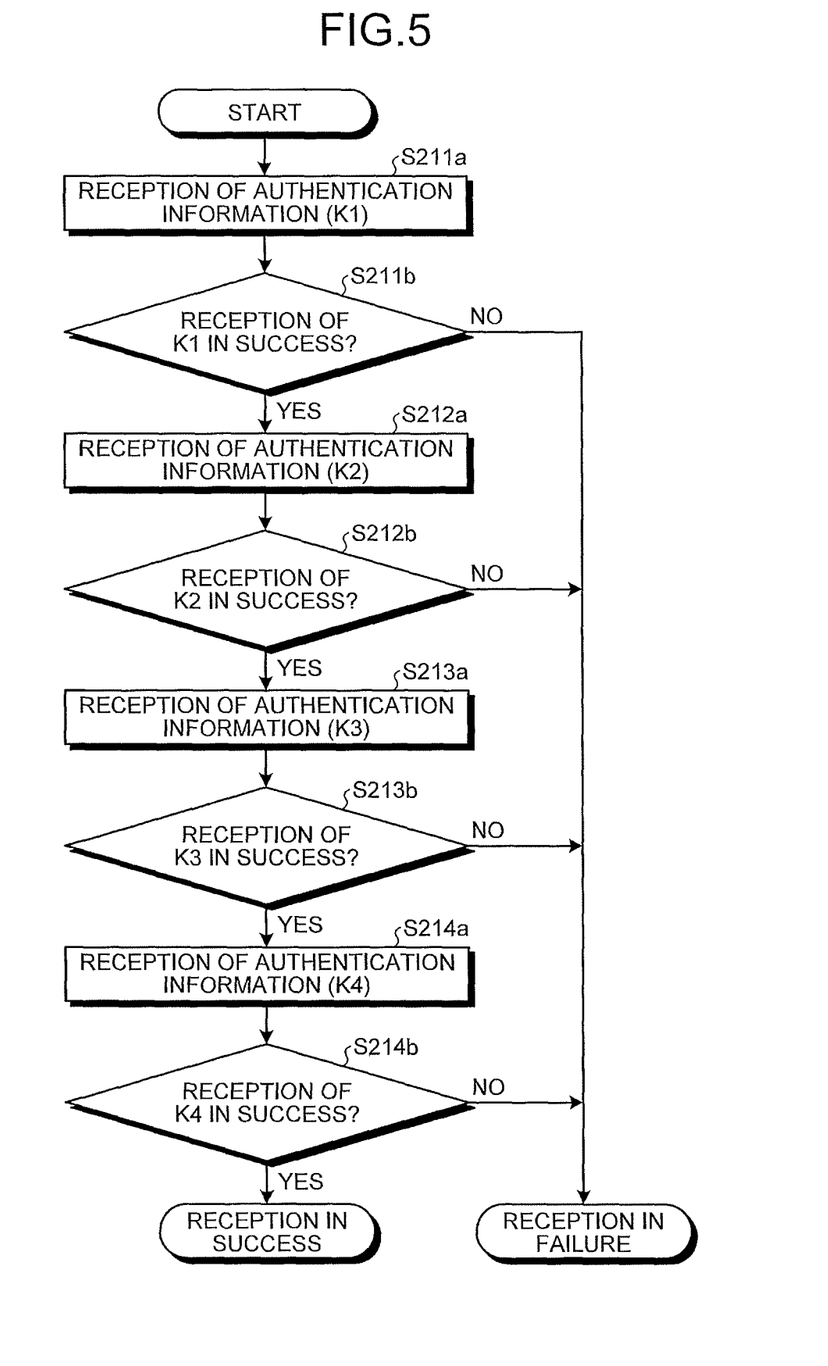
FIG. 5 is a flow chart of a first example (with order) of reception processing of pieces of partial authentication information related to the embodiment.

FIG. 5 is a flow chart of a first example (with order) of the reception processing (Step S201) for the pieces of partial authentication information.

The authentication information obtaining unit 21 receives each of the pieces of partial authentication information (K1, K2, K3, and K4) in order (Steps S211a, S212a, S213a, and S214a, respectively), proceeding to reception processing of the next piece of partial authentication information when the authentication information obtaining unit 21 succeeds in the reception (Yes at each of Steps S211b, S212b, and S213b).

When the authentication information obtaining unit 21 succeeds in the reception of the piece of partial authentication information K4 that is last in the order (Step S214b: Yes), the authentication information obtaining unit 21 proceeds to Step S202 as having succeeded in the reception processing of Step S201.

On the contrary, if the authentication information obtaining unit 21 fails in the reception of any one of the pieces of partial authentication information (No, in any of Steps S211b, S212b, S213b, and S214b), the authentication information obtaining unit 21 proceeds to Step S202 as having failed in the reception processing of Step S201.

As described above, if the reception order is determined in advance, the authentication information number may not be used, like in the packet 102.

Figure 6:
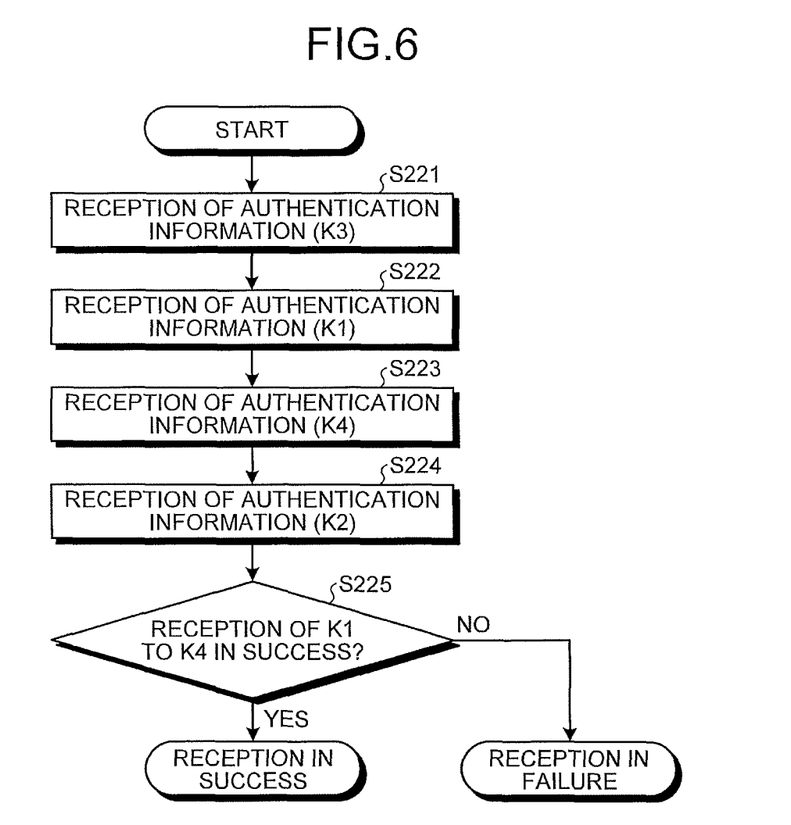
FIG. 6 is a flow chart of a second example (without order) of the reception processing of the pieces of partial authentication information related to the embodiment.

FIG. 6 is a flow chart of a second example (without order) of the reception processing (Step S201) for the pieces of partial authentication information.

The authentication information obtaining unit 21 receives the respective pieces of partial authentication information (K3, K1, K4, and K2) in random order, over a predetermined time period (Steps S221 to S224). The predetermined time period may be, for example, substantially at the same time (0.1 second, or the like).

When the authentication information obtaining unit 21 succeeds in the reception of all of the pieces of partial authentication information K1 to K4 (Step S225: Yes), the authentication information obtaining unit 21 proceeds to Step S202 as having succeeded in the reception processing of Step S201.

On the contrary, if the authentication information obtaining unit 21 fails in reception of any one of the pieces of partial authentication information (Steps S225: No), the authentication information obtaining unit 21 proceeds to Step S202 as having failed in the reception processing of Step S201.

Figure 7A:
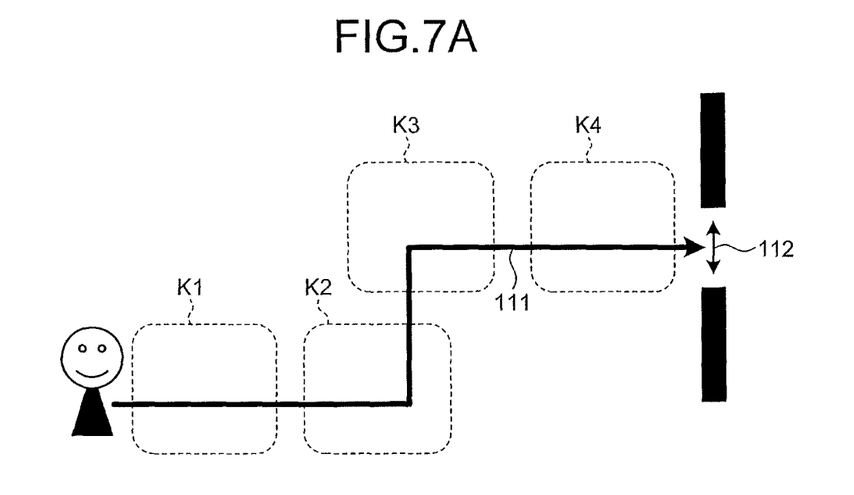
FIG. 7A is a diagram illustrating irradiation positions of pieces of partial authentication information with order.

FIG. 7A is a diagram illustrating irradiation positions of the respective pieces of partial authentication information with order.

By moving along a moving path 111, a user holding the client device 3 passes the respective irradiation ranges of optical signals from the optical signal transmitters 2 (K1→K2→K3→K4), and collects the respective pieces of partial authentication information K1 to K4. The client device 3 then makes authentication by the server device 1 successful, based on the authentication information K, resulting from integration of the respective pieces of partial authentication information K1 to K4. By opening a gate 112 with the success in the authentication, the server device 1 lets the user pass.

As described above, the range of the optical signal emitted by each of the optical signal transmitters 2 is arranged along the moving path of the client device 3, and the client device 3 integrates the optical signals from the respective optical signal transmitters 2 received in order along the moving path, into the piece of integrated authentication information.

Since a user is able to have authentication by the server device 1 executed by just following in order the lighted locations of the passage illuminated by the respective optical signal transmitters 2, the trouble of inputting authentication information to the client device 3 is able to be omitted.

Further, the following examples are modifications of the arrangement of the irradiation positions in FIG. 7A.

By making a color of an optical signal in an irradiation range where a user is able to pass (for example, blue) different from a color of an optical signal in an irradiation range of a restricted entry area (for example, red), and making the optical signal of the restricted entry area a signal for the disconnection (resetting) in Step S207, a user is able to be informed of a moving path through visual observation.

By warning a user, who has moved deviating from the moving path 111 (for example, a user who has passed like K1→K3→K4), to return to the location forgotten to be passed on the moving path 111 (for example, K2), through a display screen of the client device 3, the user is able to be made to follow the moving path surely.

Figure 7B:
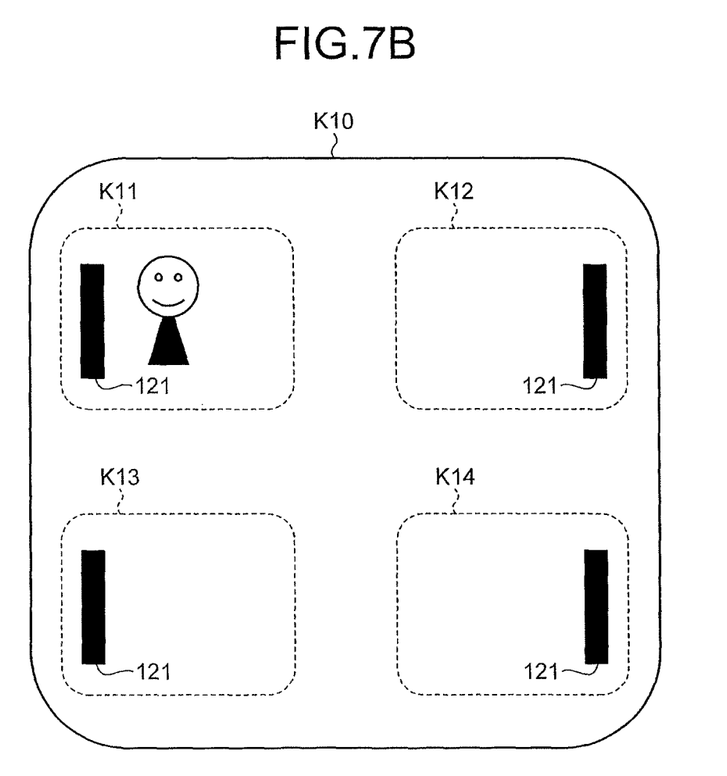
FIG. 7B is a diagram illustrating irradiation positions of pieces of partial authentication information without order.

FIG. 7B is a diagram illustrating irradiation positions of the respective pieces of partial authentication information without order.

For example, in an exhibition hall, the optical signal transmitters 2 irradiate the whole space in the hall with a first piece of partial authentication information K10, and the optical signal transmitters 2 irradiate peripheries of respective display items 121 in the space of the hall with second pieces of partial authentication information K11, K12, K13, and K14.

When the server device 1 receives an authentication request based on a piece of integrated authentication information of the pieces of partial authentication information K10 and K11 from the client device 3, the server device 1 provides, as a service, to the client device 3, explanation contents related to the display item 121 near the irradiation range of the piece of partial authentication information K11.

Further, when the server device 1 receives an authentication request based on a piece of integrated authentication information of the pieces of partial authentication information K10 and K12 from the client device 3, the server device 1 provides, as a service, to the client device 3, explanation contents related to the display item 121 near the irradiation range of the piece of partial authentication information K12.

As described above, each of the optical signal transmitters 2 is arranged such that areas of ranges of optical signals emitted therefrom overlapping each other are formed, and the authentication information integrating unit 23 of the client device 3 integrates the optical signals simultaneously received from that optical signal transmitter in the overlapping areas, into a piece of integrated authentication information.

In the above described authentication system of this embodiment, segmentalized pieces of partial authentication information are transmitted as optical signals to the client device 3, from the plurality of optical signal transmitters 2 connected to the server device 1. The client device 3 demodulates a piece of integrated authentication information from the plural pieces of partial authentication information, and requests, based on that piece of integrated authentication information, the server device 1 for authentication. The server device 1 provides a service, such as high speed communication, to the client device 3 that has succeeded in the authentication.

Thereby, a service is unable to be received unless all of the segmentalized pieces of partial authentication information are received, and the security of the communication is able to be improved. Moreover, as exemplified in FIG. 7, by arranging the irradiation ranges of the pieces of partial authentication information variously, authentication matching fine demands of the administrator side that wishes to carry out authentication is able to be realized.

In addition, by authentication information being segmentalized into plural pieces and being emitted by being distributed in various positions, such arrangement itself of the irradiation ranges of the pieces of partial authentication information causes the procedure of authentication to be complicated and hidden, and as compared to a system where one location is irradiated with only one piece of authentication information, the strength of the security is able to be improved.

Further, the service providing unit 14 establishes communication connection between the client device 3, for which authentication by the authentication processing unit 13 has succeeded, and its server device 1, and provides a communication service to the client device 3 with the service providing unit 14 serving as a relay device therefor. Thereby, a communication service that is higher in speed than the communication means used in the transmission of the optical signals by the optical signal transmitters 2 is able to be provided to the client device 3.

Furthermore, the service providing unit 14 distributes a predetermined content to the client device 3, for which authentication by the authentication processing unit 13 has succeeded. Thereby, a content, which is obtained for the first time when the client device 3 is moved to a predetermined position (the irradiation range of the optical signal), is able to be provided to the client device 3.

Moreover, as the optical signals transmitted by the optical signal transmitters 2, optical signals of visible light may be used. Thereby, a user is able to check an irradiation range of an optical signal by visual observation, and the user is able to move smoothly for obtainment of authentication information, and thereby, many users are able to be authenticated efficiently.

In addition, as the optical signals transmitted by the optical signal transmitters 2, optical signals of infrared light may be used. Thereby, without making a location to obtain authentication information known to a third party, the authentication information is able to be obtained, and thereby the confidentiality is able to be improved.

Further, each of the optical signal transmitters 2 is arranged such that areas of ranges of optical signals emitted by itself overlapping each other are generated, and the authentication information integrating unit 23 integrates the optical signals from each of the optical signal transmitters 2 simultaneously received in the overlapping areas into a piece of integrated authentication information.

Thereby, a service, such as a service for distributing explanation contents for each picture displayed in an art gallery, is able to be provided only when a user is at a local position irradiated with partial lighting.

Furthermore, each of the optical signal transmitters 2 is arranged, such that a range of an optical signal transmitted by itself is along the moving path of the client device 3, and the authentication information integrating unit 23 integrates the optical signals from the respective optical signal transmitters 2 received in order along the moving path into a piece of integrated authentication information.

Thereby, only a user who has moved along a predetermined moving path is able to be authenticated, and thus users are able to be made to comply with the moving path.

Moreover, if the authentication information obtaining unit 21 receives a new piece of partial authentication information different from a piece of partial authentication information used already when authentication succeeded, the authentication information obtaining unit 21 cancels the succeeded authentication.

Thereby, abuse after authentication is able to be limited when, for example, a user has gone outdoors after being authenticated indoors in an authentication area.

According to the present invention, an authentication means is able to be provided, which improves security further while keeping convenience of automatic authentication.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. An authentication system, comprising:
 a client device that requests authentication;
 a server device that authenticates the client device; and a plurality of optical signal transmitters that transmit, as optical signals, authentication information to be used in the authentication, wherein the server device comprises:
a memory; and
a processor coupled to the memory, wherein the processor executes a process comprising:
associating each piece of partial authentication information resulting from segmentalization of whole authentication information into plural pieces, with each of the optical signal transmitters in charge of transmission of each piece of the partial authentication information and storing the associated piece of the partial authentication information in the memory;
outputting the pieces of the partial authentication information stored in the memory to the respective optical signal transmitters in order to cause the respective optical signal transmitters to repeatedly transmit optical signals modulated from the partial authentication information, each of the optical signal transmitters respectively associated with a piece of the partial authentication information; and
authenticating, when authentication is requested from the client device, the client device, based on integrated pieces of the partial authentication information outputted with the request, and the whole authentication information before being segmentalized,
and the client device comprises:
a memory; and
a processor coupled to the memory, wherein the processor executes a process comprising:
receiving the respective optical signals transmitted from the respective optical signal transmitters, and obtaining the respective pieces of partial authentication information by demodulating the received optical signals; and
integrating the obtained plural pieces of partial authentication information into integrated authentication information, and
requesting the server device for authentication, by use of the integrated authentication information, and
wherein each of the plurality of optical signal transmitters is located in a different physical position, and
the respective optical signal transmitters are arranged, with ranges of optical signals transmitted by themselves along a moving path of the client device, and the process executed by the processor of the client device comprises integrating the respective optical signals from the respective optical signal transmitters received in order along the moving path, into the integrated authentication information.

2. The authentication system according to claim 1, wherein the process executed by the processor of the server device further comprises establishing communication connection between the client device, for which authentication has succeeded, and the server device that executes the establishing, and providing a communication service to the client device, with its own server device being a relay device therefor.

3. The authentication system according to claim 1, wherein the process executed by the processor of server device further comprises distributing a predetermined content to the client device, for which authentication has succeeded.

4. The authentication system according to claim 1, wherein the optical signal transmitters use optical signals of visible light, as the optical signals transmitted by themselves.

5. The authentication system according to claim 1, wherein the optical signal transmitters use optical signals of infrared light, as the optical signals transmitted by themselves.

6. The authentication system according to claim 1, wherein each of the optical signal transmitters is arranged such that areas overlapping with each other are formed as ranges of optical signals transmitted by itself, and the process executed by the processor of the client device comprises integrating the respective optical signals from each of the respective optical signal transmitters received in the overlapping areas, into the integrated authentication information.

7. The authentication system according to claim 1, wherein when the processor of the client device receives a new piece of partial authentication information different from the piece of partial authentication information used already when authentication succeeded, and wherein the processor of the client device cancels the authentication that has succeeded.

8. An authentication method, wherein the authentication method is executed by an authentication system comprising:
a client device that requests authentication comprising:
a memory; and
a processor coupled to the memory,
a server device that authenticates the client device comprising:
a memory; and
a processor coupled to the memory, and
a plurality of optical signal transmitters that transmit, as optical signals, authentication information used in the authentication, wherein the authentication method comprising:
associating, executed by the processor of the server device, each piece of partial authentication information resulting from segmentalization of whole authentication information into plural pieces, with each of the optical signal transmitters in charge of transmission of each piece of the partial authentication information and storing, executed by the processor of the server device, the associated piece of the partial authentication information in the memory;
outputting, executed by the processor of the server device, the pieces of the partial authentication information stored in the memory to the respective optical signal transmitters in order to cause the respective optical signal transmitters to repeatedly transmit optical signals modulated from the partial authentication information, each of the optical signal transmitters respectively associated with a piece of the partial authentication information;
receiving, executed by the processor of the client device, the respective optical signals transmitted from the respective optical signal transmitters, and obtaining, executed by the processor of the server device, the respective pieces of partial authentication information by demodulating the received optical signals;

integrating, executed by the processor of the client device, the obtained plural pieces of partial authentication information into integrated authentication information;

requesting, executed by the processor of the client device, the server device for authentication, by use of the integrated authentication information;

authenticating, executed by the processor of the server device, when authentication is requested from the client device, the client device, based on the received integrated authentication information outputted with the request, and the whole authentication information before being segmentalized, and wherein each of the plurality of optical signal transmitters is located in a different physical position, and the respective optical signal transmitters are arranged, with ranges of optical signals transmitted by themselves along a moving path of the client device, and the process executed by the processor of the client device comprises integrating the respective optical signals from the respective optical signal transmitters received in order along the moving path, into the integrated authentication information.

9. A server device, wherein the server device is used in an authentication system comprising:

client devices that request authentication;

the server device that authenticates the respective client devices; and a plurality of optical signal transmitters that transmit, as optical signals, authentication information used in the authentication, and the server device comprises:

a memory; and a processor coupled to the memory, wherein the processor executes a process comprising:

associating each piece of partial authentication information resulting from segmentalization of whole authentication information into plural pieces, with each of the optical signal transmitters in charge of transmission of each piece of the partial authentication information and storing the associated piece of the partial authentication information in the memory;

outputting the pieces of the partial authentication information stored in the memory to the respective optical signal transmitters in order to cause the respective optical signal transmitters to repeatedly transmit optical signals modulated from the partial authentication information, each of the optical signal transmitters respectively associated with a piece of the partial authentication information; and authenticating, when authentication is requested from the client device, the client device, based on integrated pieces of the partial authentication information outputted with the request, and the whole authentication information before being segmentalized, and wherein each of the plurality of optical signal transmitters is located in a different physical position, and the respective optical signal transmitters are arranged, with ranges of optical signals transmitted by themselves along a moving path of the client device, and the process executed by the processor of the client device comprises integrating the respective optical signals from the respective optical signal transmitters received in order along the moving path, into the integrated authentication information.

10. A client device, wherein the client device is used in an authentication system comprising:

client devices that request authentication;

a server device that authenticates the respective client devices; and a plurality of optical signal transmitters that transmit, as optical signals, authentication information used in the authentication, the authentication information is one piece of whole authentication information managed by the server device and segmentalized into plural pieces of partial authentication information, and the client device comprises:

a memory; and a processor coupled to the memory, wherein the processor executes a process comprising:

receiving the respective optical signals transmitted from the respective optical signal transmitters, and obtaining the respective pieces of partial authentication information by demodulating the received optical signals; and integrating the obtained plural pieces of partial authentication information into integrated authentication information, and requesting the server device for authentication, by use of the integrated authentication information, and wherein each of the plurality of optical signal transmitters is located in a different physical position, and the respective optical signal transmitters are arranged, with ranges of optical signals transmitted by themselves along a moving path of the client device, and the process executed by the processor of the client device comprises integrating the respective optical signals from the respective optical signal transmitters received in order along the moving path, into the integrated authentication information.

* * * * *